US012739822B2

(12) United States Patent
Li

(10) Patent No.: US 12,739,822 B2
(45) Date of Patent: Sep. 15, 2026

(54) LOGIC CHANNEL MULTIPLEXING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 930 days.

(21) Appl. No.: 18/004,019

(22) PCT Filed: Jul. 23, 2020

(86) PCT No.: PCT/CN2020/103785

§ 371 (c)(1),
(2) Date: Dec. 30, 2022

(87) PCT Pub. No.: WO2022/016450

PCT Pub. Date: Jan. 27, 2022

(65) Prior Publication Data

US 2023/0300825 A1 Sep. 21, 2023

(51) Int. Cl.
*H04W 72/1268* (2023.01)
*H04W 72/51* (2023.01)

(52) U.S. Cl.
CPC ....... *H04W 72/1268* (2013.01); *H04W 72/51* (2023.01)

(58) Field of Classification Search
CPC .... H04W 72/1268; H04W 72/51; H04W 8/24
See application file for complete search history.

(56) References Cited

U.S. PATENT DOCUMENTS

2012/0044905 A1 2/2012 Kim
2016/0007229 A1 1/2016 Gao et al.
2019/0268919 A1 8/2019 Shi et al.
2021/0194819 A1* 6/2021 Chen .................... H04L 47/193
2022/0295334 A1* 9/2022 Sun .................. H04W 72/0453

FOREIGN PATENT DOCUMENTS

| | | | |
|---|---|---|---|
| CN | 1338192 | A | 2/2002 |
| CN | 1768488 | A | 5/2006 |
| CN | 101350946 | A | 1/2009 |
| CN | 108684075 | A | 10/2018 |
| CN | 110149726 | A | 8/2019 |
| CN | 110199560 | A | 9/2019 |
| CN | 110710291 | A | 1/2020 |
| CN | 111314889 | A | 6/2020 |

(Continued)

OTHER PUBLICATIONS

"Discussion on UCI enhancement for URLLC," Proceeding of the 3GPP TSG RAN WG1 #99, Xiaomi, R1-1911994, Nov. 18, 2019, Reno, Nevada, 4 pages.

(Continued)

*Primary Examiner* — Ashley Shivers
(74) *Attorney, Agent, or Firm* — McCoy Russell LLP

(57) ABSTRACT

A logic channel multiplexing method performed by user equipment (UE) includes: determining a logic channel multiplexing operation based on a logic channel multiplexing restriction related to computational power.

20 Claims, 6 Drawing Sheets determine a logic channel multiplexing operation based on a logic channel multiplexing restriction related to computational power

S110

(56) References Cited

FOREIGN PATENT DOCUMENTS

| | | | |
|---|---|---|---|
| CN | 111367679 | A | 7/2020 |
| IN | 201937054378 | A | 5/2020 |
| WO | 2018027822 | A1 | 2/2018 |
| WO | 2019200507 | A1 | 10/2019 |
| WO | 2020013030 | A1 | 1/2020 |
| WO | 2020076953 | A1 | 4/2020 |
| WO | 2020133450 | A1 | 7/2020 |

OTHER PUBLICATIONS

Zhou, M. et al., “A Method for Realizing Multiplexing Technology in IBOC Digital Audio Broadcasting System,” Journal of Communication University of China (Science and Technology), vol. 16, No. 3, Sep. 2009, 1 page. (Submitted with English Abstract).

Feng, C. et al., “Research on Design of LTE System MAC Multiplexing Entity,” Telecommunication Engineering, vol. 50, No. 10, Oct. 2010, 5 pages. (Submitted with English Abstract).

“UL Logical Channel Prioritization and Multiplexing,” Proceedings of the 3GPP TSG-RAN WG2 Meeting #104, Sony, R2-1817077, Nov. 12, 2018, Spokane, Washington, 3 pages.

* cited by examiner determine a logic channel multiplexing operation based on a logic channel multiplexing restriction related to computational power

S110

Network side

Logic channel multiplexing apparatus

Determining module 510

Logic channel multiplexing apparatus

Transmitting module 610

Fig. 6

LOGIC CHANNEL MULTIPLEXING METHOD AND APPARATUS, COMMUNICATION DEVICE, AND STORAGE MEDIUM

CROSS REFERENCE TO RELATED APPLICATION

The present application is a U.S. National Phase of International Application No. PCT/CN2020/103785 entitled "REPORTING METHOD AND APPARATUS FOR USER EQUIPMENT ASSISTANCE INFORMATION, USER EQUIPMENT, AND STORAGE MEDIUM," and filed on Jul. 23, 2020. The entire contents of each of the above-listed applications are hereby incorporated by reference for all purposes.

BACKGROUND

Uplink authorization signaling (grant) is generally used for scheduling uplink transmission of user equipment (UE) at a network side (such as a base station).

Uplink transmission needs to occupy various resources. For instance, the typical resources occupied by the uplink transmission are radio resources of an uplink channel.

SUMMARY

A first aspect of an example of the disclosure provides a logic channel multiplexing method, performed by user equipment (UE), and including:

- determining a logic channel multiplexing operation based on a logic channel multiplexing restriction related to computational power.

A second aspect of an example of the disclosure provides a logic channel multiplexing method, performed by a network side device, and including:

- transmitting uplink authorization signaling, where resources scheduled by the uplink authorization signaling are able to be used for logic channel multiplexing according to a logic channel multiplexing restriction related to computational power.

A third aspect of an example of the disclosure provides a communication device, including a processor, a transceiver, a memory and an executable program stored on the memory and capable of being run by the processor, and the processor, when running the executable program, executes the method shown in any technical solution of the first aspect or the second aspect.

A fourth aspect of an example of the disclosure provides a non-transitory computer-readable storage medium, storing an executable program; and the executable program can implement the method shown in any technical solution of the first aspect or the second aspect after being executed by a processor.

It is to be understood that the above general descriptions and later detailed descriptions are merely examples and illustrative, and cannot limit the examples of the disclosure.

BRIEF DESCRIPTION OF THE DRAWINGS

The accompanying drawings here are incorporated into the specification and constitute a part of the specification, showing the principles consistent with the examples of the disclosure and used together with the specification to explain the examples of the disclosure.

FIG. 6 is a schematic structural diagram of a logic channel multiplexing apparatus illustrated according to an example.

DETAILED DESCRIPTION

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the disclosure. Rather, they are merely instances of apparatuses and methods consistent with some aspects of the examples of the disclosure as detailed in the appended claims.

The terms used in the examples of the disclosure are merely for the purpose of describing specific examples, and not intended to limit the examples of the disclosure. The singular forms "one" and "the" used in the examples of the disclosure and the appended claims are also intended to include the plural forms unless the context clearly indicates other meanings. It also needs to be understood that the term "and/or" as used here refers to and includes any or all possible combinations of one or more associated listed items.

It needs to be understood that although the terms first, second, third, etc. may be used to describe various information in the examples of the disclosure, such information should not be limited to these terms. These terms are merely used to distinguish the same type of information from each other. For instance, without departing from the scope of the examples of the disclosure, first information may also be referred to as second information, and similarly, the second information may also be referred to as the first information. Depending on the context, the word "if" as used herein can be interpreted as "at the time" or "when" or "in response to determining".

The disclosure relates to the technical field of wireless communication but not limited to this, in particular to a logic channel multiplexing method and apparatus, a communication device, and a storage medium.

Uplink authorization signaling (grant) is generally used for scheduling uplink transmission of user equipment (UE) at a network side (such as a base station).

Uplink transmission needs to occupy various resources. For instance, the typical resources occupied by the uplink transmission are radio resources of an uplink channel.

However, with the development of the technology, the uplink transmission may consume not merely the radio resources, but also other resources.

At this time, during logic channel multiplexing, how to ensure that services corresponding to a logic channel can be well carried by multiplexing to a transmission channel or resources corresponding to the transmission channel is a problem that needs to be further solved in the related art.

Figures 1, 2:
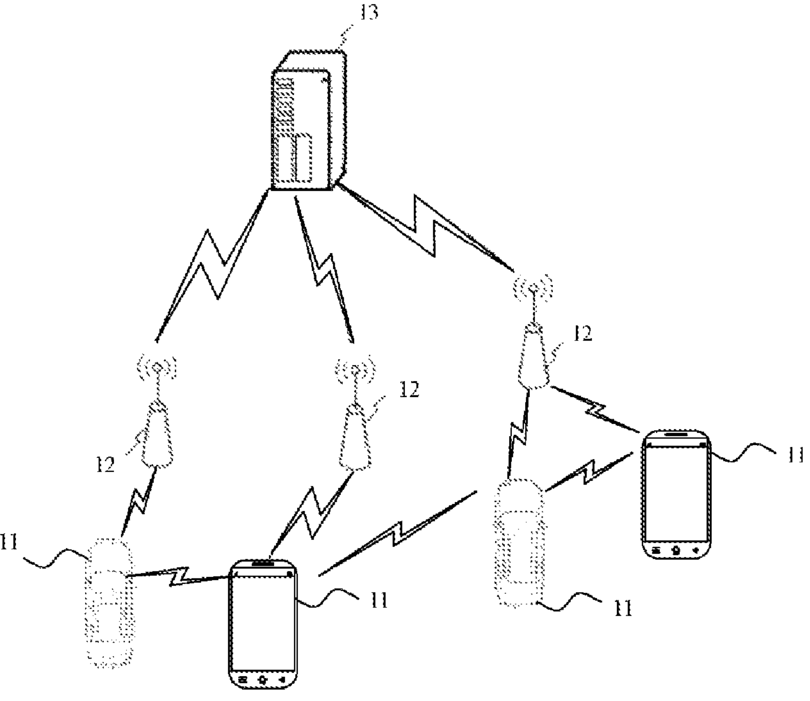
FIG. 1 is a schematic structural diagram of a wireless communication system illustrated according to an example.
FIG. 2 is a schematic flow chart of a logic channel multiplexing method illustrated according to an example.

Please refer to FIG. 1, which illustrates a schematic structural diagram of a wireless communication system provided by an example of the disclosure. As shown in FIG. 1, the wireless communication system is a communication system based on a cellular mobile communication technology. The wireless communication system may include: a plurality of UE 11 and a plurality of base stations 12.

The UE 11 may refer to devices that provide a user with voice and/or data connectivity. The UE 11 may communicate with one or more core networks via a radio access network (RAN). The UE 11 may be UE of Internet of Things, such as sensor devices, mobile phones (or called "cellular" phones) and computers with the UE of Internet of Things. For instance, it may be fixed, portable, pocket-size, handheld, computer built-in or vehicle-mounted apparatuses. For instance, it may be a station (STA), a subscriber unit, a subscriber station, a mobile station, a mobile, a remote station, an access point, a remote terminal, an access terminal, a user terminal, a user agent, a user device, or user equipment (UE). Or, the UE 11 may also be unmanned aircraft devices. Or, the UE 11 may also be vehicle-mounted devices, such as a trip computer with a wireless communication function, or a wireless communication device externally connected with the trip computer. Or, the UE 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also known as a long term evolution (LTE) system; or the wireless communication system may also be a 5G system, also known as a new radio (NR) system or a 5G NR system. Or, the wireless communication system may also be a next-generation system of the 5G system. An access network in the 5G system may be called a new generation-radio access network (NG-RAN). Or, an MTC system.

The base stations 12 may be evolved base stations (eNB) adopted in the 4G system. Or, the base stations 12 may also be base stations (gNB) adopting centralized and distributed architectures in the 5G system. When the base stations 12 adopt the centralized and distributed architectures, they typically each include a central unit (CU) and at least two distributed units (DUs). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the example of the disclosure.

The base stations 12 and the UE 11 may establish wireless connection through a wireless radio. In different implementations, the wireless radio is a wireless radio based on the 4G standard; or, the wireless radio is a wireless radio based on the 5G standard, such as a new radio; or, the wireless radio may also be a wireless radio based on the next-generation mobile communication standard of 5G.

In some examples, the UE 11 may also establish end to end (E2E) connection. For instance, vehicle to vehicle (V2V) communication, vehicle to infrastructure (V2I) communication and vehicle to pedestrian (V2P) communication in vehicle to everything (V2X) communication and other scenarios.

In some examples, the above wireless communication system may further include a network management device 13.

The plurality of base stations 12 are connected with the network management device 13. The network management device 13 may be a core network device in the wireless communication system, for instance, the network management device 13 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS).

The implementation form of the network management device 13 is not limited in the example of the disclosure.

Mobile applications based on artificial intelligence (AI) services or machine learning (ML) are becoming more and more computationally intensive, memory consuming and power consuming. At the same time, a terminal device usually has strict restrictions on energy consumption, computing and memory costs. Thus, many AI applications or ML applications currently intend to unload a training or reasoning process from a mobile device to a network side, such as a base station side. At this time, from the perspective of the resources needed by user equipment (UE), there are two dimensions, one is the dimension of wireless resources, that is, the resources of a wireless interface (a first type of resources) that we usually understand, such as a wireless bandwidth needed by UE uplink transmission. In an existing implementation, an evolved node B (eNB) allocates this type of resources to the UE. However, with the introduction of new services of the AI/ML mobile applications, in addition to the first dimension of resources, more attention needs to be paid to a second dimension, which is a computational power dimension (a second type of resources). That is, computational power resources consumed by a base station also need to be considered, such as a central processing unit (CPU), and a memory. Thus, for a certain authorization provided by the base station, if merely a type1 of resources are provided, it may not be applicable to a logic channel corresponding to the AI services or the ML services. Thus, additional processing is needed by the logic channel corresponding to the AI services or the ML services in logic channel priority processing.

As shown in FIG. 2, an example of the disclosure provides a logic channel multiplexing method, performed by user equipment (UE), and including:

S110: a logic channel multiplexing operation is determined based on a logic channel multiplexing restriction related to computational power.

Before logic channel multiplexing is performed on a UE side, how to perform logic channel multiplexing may be determined according to the logic channel multiplexing restriction related to the computational power.

The UE may include, but not limited to: a fixed terminal and a mobile terminal. The mobile terminal includes, but not limited to: a wearable device worn by a user or a mobile phone and other communication devices; and the mobile terminal may further include: a vehicle-mounted device and the like.

Here, how to perform logic channel multiplexing, may include:

during logic channel multiplexing, whether it needs to consider the logic channel multiplexing restriction related to the computational power, for instance, in case that it needs to consider the logic channel multiplexing restriction related to the computational power, when a logic channel is multiplexed to corresponding processing resources, it needs to consider whether resources multiplexed by the logic channel can provide computational power resources needed by a multiplexed logic channel.

For another instance, in case that it does not need to consider the logic channel multiplexing restriction related to the computational power, when the logic channel is multiplexed to the corresponding processing resources, it does not need to consider whether the resources multiplexed by the logic channel can provide the computational power resources needed by the multiplexed logic channel.

Here, the logic channel multiplexing may also be understood as mapping of the logic channel. One or more logic channels are mapped to a transmission channel, and processing resources of the transmission channel may include: radio resources and/or computational power resources. The radio resources may also be called transmission resources, which are mainly used for information transmission. The computational power resources are mainly used for computing.

In case that the logic channel multiplexing restriction related to the computational power is considered during the logic channel multiplexing, after the logic channel multiplexing, there will be no phenomenon of uplink transmission failure, high retransmission rate of uplink transmission or poor service quality of services caused by a situation that a network side cannot provide the computational power resources needed by the logic channel, thus improving the service quality of uplink services.

In one example, the logic channel multiplexing restriction related to the computational power includes:

the resources accepting multiplexing of the logic channel need to provide the computational power resources needed by the multiplexed logic channel, for instance, the computational power resources contained by the resources accepting the multiplexing of the logic channel are larger than or equal to the computational power resources needed by the multiplexed logic channel.

For instance, a channel accepting the multiplexing of the logic channel may include: various shared channels of a physical layer, and the shared channels here include, but not limited to: a physical uplink shared channel (PUSCH).

The computational power resources include: various computer resources related to computing, which specifically include, but not limited to:

computing resources and storage resources. The computing resources include: processor resources; and the storage resources include memory resources and the like.

The processor resources may include: resources of a central processing unit (CPU), resources of a graphic processing unit (GPU) or resources of a digital signal processor (DSP) and the like.

In this way, during logic channel multiplexing, a multiplexing restriction of the computational power resources is introduced, in this way, the situation that the multiplexing restriction of the computational power resources is not introduced, which causes the phenomenon of insufficient computational power resources to occur after one or more logic channels are multiplexed to processing resources corresponding to the transmission channel, resulting in impossible completion of corresponding services is reduced.

In some examples, S110 may include:

the logic channel multiplexing operation is determined according to a service type corresponding to the logic channel and the logic channel multiplexing restriction related to the computational power.

For instance, the service type includes: a first type and a second type; and computational power resources needed by the first type of service are more than computational power resources needed by the second type of service.

At this time, S110 may include: in response to that the service type corresponding to the logic channel is the first type, the logic channel multiplexing operation is determined according to the logic channel multiplexing restriction related to the computational power; and/or in response to that the service type corresponding to the logic channel is the second type, the logic channel multiplexing operation is not determined according to the logic channel multiplexing restriction related to the computational power.

The first type of service may include: a service related to artificial intelligence (AI) and/or a service related to machine learning (ML).

The second type of service may be other services other than the service related to AI or the service related to ML, such as, a conventional voice service or video service.

The service related to AI includes, but not limited to at least one of the following:

an AI application service, such as a service provided by applying an AI model, such as image recognition and/or voice processing based on the AI model; or an AI training service, used to train the AI model.

The service related to ML includes, but not limited to at least one of the following:

an ML application service, such as a service provided by applying an ML model, such as image recognition and/or voice processing based on the ML model; or an ML generation service, used to generate a service of the ML model based on reasoning operations such as induction and refinement of sample data.

Figure 3:
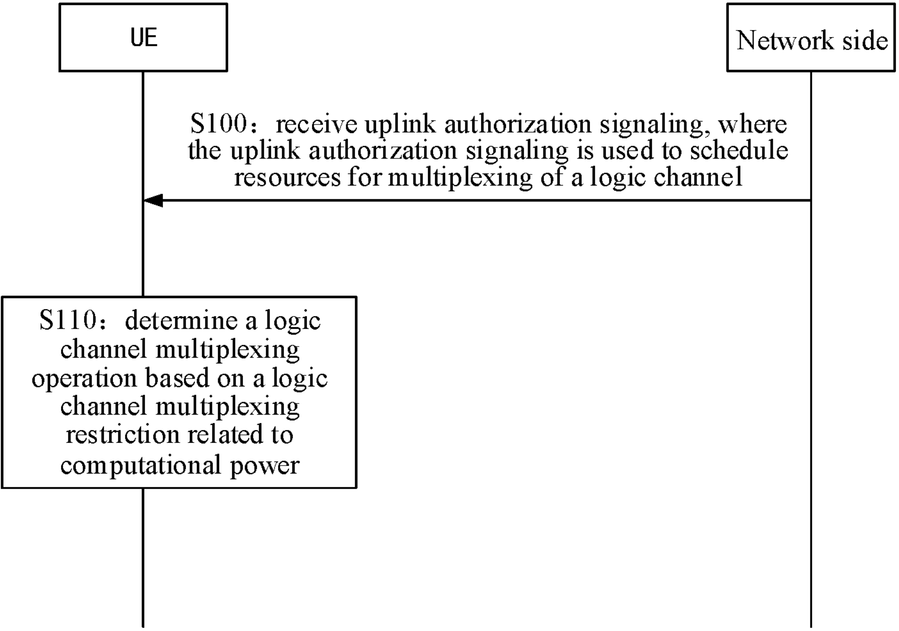
FIG. 3 is a schematic flow chart of a logic channel multiplexing method illustrated according to an example.

In some examples, as shown in FIG. 3, the method further includes:

S100: uplink authorization signaling is received, where the uplink authorization signaling is used to schedule resources for multiplexing of a logic channel.

In some examples, the logic channel multiplexing restriction related to the computational power is bound with or embodied by the uplink authorization signaling.

The uplink authorization signaling may be used to schedule a PUSCH, for example, schedule resources of the PUSCH.

Certainly, the specific multiplexing of the to-be-multiplexed logic channel is the multiplexing to the resources corresponding to the uplink authorization signaling currently received, it further needs to determine whether the logic channel multiplexing restriction is met, in case that the logic channel multiplexing restriction is met, the corresponding logic channel may be multiplexed to the resources corresponding to the uplink authorization signaling currently received, and in case that the logic channel multiplexing restriction is not met, the corresponding logic channel may be multiplexed to resources of next one or more pieces of received uplink authorization signaling.

Here, the logic channel multiplexing restriction includes:

the aforementioned logic channel multiplexing restriction related to the computational power; and may further contain a logic channel multiplexing restriction related to a priority.

For instance, different logic channels have different priorities, in case that there are a plurality of logic channels to be multiplexed, a logic channel with a high priority may be preferably multiplexed according to the priorities of the logic channels and the logic channel multiplexing restriction related to the priority.

The indication information includes:

a flag bit, having one of the following values:

a first value, indicating having sufficient computational power resources; or a second value, indicating not having sufficient computational power resources.

The flag bit may be indicated by one or more bits. In order to save the signaling cost of the uplink authorization signaling, the flag bit may be 1 bit. Two bit values of one bit are respectively used to indicate whether there are sufficient computational power resources. In case that the flag bit is composed of 1 bit, the value of the bit may be "0" or "1".

For instance, a current load rate of the network side is very low, indicating having many idle resources on the network side, at this time, the network side may set the value of the flag bit as the first value without distinguishing the computational power resources needed by the to-be-multiplexed logic channel.

For another instance, the current load rate of the network side is very high, indicating that most of the resources of the network side are occupied, at this time, the network side may set the value of the flag bit as the second value without specifically distinguishing the computational power resources needed by the to-be-multiplexed logic channel.

In case that the UE determines that the to-be-multiplexed logic channel needs to meet the logic channel multiplexing restriction related to the computational power, then in case that the processing resources where the to-be-multiplexed logic channel is to be mapped are the above uplink authorization signaling carrying the first value, the UE may consider that the logic channel multiplexing restriction related to the computational power is met, and the corresponding logic channel is multiplexed to the processing resources indicated by the uplink authorization signaling.

In another example, the network side may know the logic channel to be multiplexed by the UE in advance, after the computational power resources needed by one or more to-be-multiplexed logic channels are estimated, in response to determining it is determined that the network side can provide the resources needed by the to-be-multiplexed logic channels according to the self idle resources, the flag bit of the uplink authorization signaling is set to have the first value, otherwise, the flag bit of the uplink authorization signaling may be set to have the second value.

In some examples, the method may further include:

in response to that the flag bit has the first value, it is determined that the received resources corresponding to the uplink authorization signaling meet the logic channel multiplexing restriction related to the computational power; and in response to that the flag bit has the second value, it is determined that the received resources corresponding to the uplink authorization signaling do not meet the logic channel multiplexing restriction related to the computational power.

In some examples, the uplink authorization signaling carries indication information of computational power resources.

For instance, the indication information of the computational power resources carried by the uplink authorization signaling may be: indication information of current computational power resources of the network side, and may also be indication information of computational power resources currently allocated to the uplink authorization signaling by the network side.

In some examples, S110 includes:

in response to that the computational power resources corresponding to the uplink authorization signaling are larger than or equal to computational power resources needed by the logic channel, it is determined that a to-be-multiplexed logic channel is multiplexed to the resources corresponding to the uplink authorization signaling; or in response to that the computational power resources corresponding to the uplink authorization signaling are less than the computational power resources needed by the logic channel, it is determined that the to-be-multiplexed logic channel is not multiplexed to the resources corresponding to the uplink authorization signaling.

In one example, the indication information includes at least one of the following:

a computing quantity indication, used to indicate a computing quantity capable of being provided;

a computing bit length indication, used to indicate a computing bit length capable of being provided; or a memory consumption indication, used to indicate memory consumption capable of being provided during computing.

For instance, many calculations are needed to provide one first type of service, and these calculations may obtain the computing quantity by statistics. For instance, the computing quantity indication may provide the number of times of multiplication and the number of times of addition of an AI service, such as N times of addition and multiplication.

Whether the resources corresponding to one piece of uplink authorization signaling can provide the computing quantity needed by the corresponding first type of service may be identified by the computing quantity indication.

The computing bit length indication may indicate a resource attribute of computing resources configured for the uplink authorization signaling by the current network side. For instance, the CPU and the GPU have certain bit lengths. For instance, there are a large quantity of calculators on the network side, however, the network side provides services for a large amount of UE, and there may be a situation that the CPU or the GPU that can provide the corresponding bit length has been allocated, and at this time, there are no computing resources that can provide the corresponding AI services.

In some cases, some AI models or ML models support different bit lengths for the CPU or the GPU, for instance, some need to support 32 bits, some need to support 64 bits, and some even need to support 128 bits. In case that a model used by one AI service is requisitely computed by using the CPU or the GPU of 64 bits, and in case that the current network side merely has the CPU or the GPU of 32 bits being idle, it is indicated that there is no idle resource to be allocated to the uplink authorization signaling, and thus, the uplink authorization signaling does not have the computational power resources needed by the logic channel corresponding to the AI service.

In a process of computing, a memory will be needed for data storage, which will consume the memory. In case that the memory of the network side is insufficient, and when the memory needed by the service provision of the corresponding logic channel is provided, the phenomenon that the corresponding service cannot be provided, or the providing delay is large may be caused. In some examples, the computational power resources needed by the logic channel are determined by the UE, or configured by the network.

The computational power resources needed by the logic channel may be estimated by the UE itself, for instance, the UE estimates itself according to a historical consumption condition of the computational power resources of the same service. Alternatively, the UE estimates the computational power resources needed by the logic channel according to the service attribute of the service corresponding to the logic channel.

In another example, the computational power resources needed by the logic channel are indicated by the network, and for example, by the network through configuration information of the logic channel.

In some examples, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

In case that the configuration attribute of the logic channel multiplexing restriction related to the computational power is the mandatory attribute, it means that during the logic channel multiplexing, the consideration of the logic channel multiplexing restriction related to the computational power is requisite, and thus, during the logic channel multiplexing, it needs to consider whether the computational power resources corresponding to the corresponding uplink authorization signaling can meet the to-be-multiplexed logic channel.

In case that the configuration attribute of the logic channel multiplexing restriction related to the computational power is the optional attribute, it means that during the logic channel multiplexing, the logic channel multiplexing restriction related to the computational power may be considered or not. In case that the logic channel multiplexing restriction related to the computational power is not considered, during the logic channel multiplexing, it does not need to consider whether the current computational power resources corresponding to the uplink authorization signaling are larger than or equal to the computational power resources of the to-be-multiplexed logic channel.

Figures 4, 5:
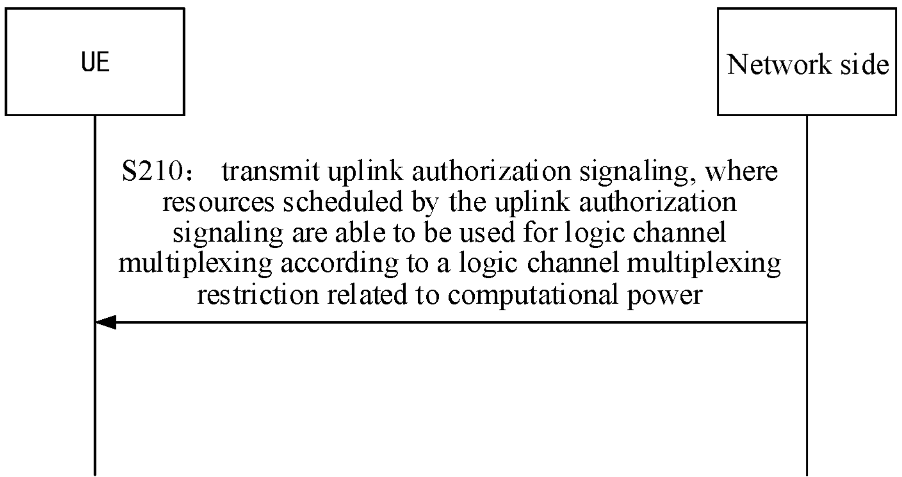
FIG. 4 is a schematic flow chart of a logic channel multiplexing method illustrated according to an example.
FIG. 5 is a schematic structural diagram of a logic channel multiplexing apparatus illustrated according to an example.

As shown in FIG. 4, an example of the disclosure provides a logic channel multiplexing method, performed by a network side device, and including:

S210: uplink authorization signaling is transmitted, where resources scheduled by the uplink authorization signaling are able to be used for logic channel multiplexing according to a logic channel multiplexing restriction related to computational power.

In some examples, the uplink authorization signaling is originally used to schedule an uplink channel or resources of uplink transmission.

In the example of the disclosure, the resources scheduled by the uplink authorization signaling are able to be used for logic channel multiplexing according to the logic channel multiplexing restriction related to the computational power on a UE side.

The related description of the logic channel multiplexing restriction related to the computational power here may refer to the aforementioned examples, which will not be repeated here.

In some examples, the uplink authorization signaling provides indication information for indicating the computational power resources.

In some examples, the indication information includes:

a flag bit, having one of the following values:

a first value, indicating having sufficient computational power resources;

or, a second value, indicating not having sufficient computational power resources.

In some examples, the indication information includes: a computational power indication, used to indicate the computational power resources.

For instance, the computational power resources are represented by at least one of the following computational power indications: a computing quantity indication, used to indicate a computing quantity; a computing bit length indication, used to indicate a computing bit length; or a memory consumption indication, used to indicate memory consumption during computing.

In some examples, the method further includes:

configuration information of the logic channel is transmitted to UE, where the configuration information is at least used to determine the computational power resources needed by the logic channel.

By transmitting the configuration information of the logic channel to the UE, the UE is informed of the computational power resources needed by the logic channel.

In some examples, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

Mobile applications based on AI/ML are becoming more and more computationally intensive, memory consuming and power consuming. At the same time, a terminal device usually has strict restrictions on energy consumption, computing and memory costs. Thus, many AI/ML applications currently intend to unload a training or reasoning process from a mobile device to a network side, such as a base station side. At this time, from the perspective of the resources needed by the UE, there are two dimensions, one is the dimension of wireless resources, that is, the resources of a wireless interface that we usually understand, namely a first type (type1) of resources, such as a wireless bandwidth needed by UE uplink transmission that we usually understand. In an existing implementation, an eNB allocates this type of resources to the UE. However, with the introduction of new services of the AI/ML mobile applications, in addition to a first dimension of resources, more attention needs to be paid to a second dimension, which is a computational power dimension, namely a second type (type2) of resources. That is, computational power resources consumed by a base station also need to be considered, such as a CPU and a memory. Thus, for a certain authorization provided by the base station, in case that merely a type1 of resources are provided, it may not be applicable to a logic channel corresponding to the AI services or the ML services. Thus, additional processing is needed by the logic channel corresponding to the AI services or the ML services in logic channel priority processing.

A new logic channel multiplexing restriction is added to the logic channel multiplexing corresponding to the AI service or the ML service.

The new logic channel multiplexing restriction being added to the logic channel multiplexing corresponding to the AI service or the ML service may be whether the logic channel meets a computational power restriction condition provided by the network side.

In some examples, the computational power restriction condition provided by the network side may be that the network provides a flag bit (flag) in the uplink authorization signaling (grant) to indicate to the UE that the current computational power resources are sufficient. In case that the flag bit (flag) is set, it means that the logic channel corresponding to the AI service or the ML service may be multiplexed into the uplink authorization signaling (grant).

Based on the above the new logic channel multiplexing restriction being added to the logic channel multiplexing corresponding to the AI service or the ML service may be whether the logic channel meets a computational power restriction condition provided by the network side, the computational power restriction condition provided by the network side may be that the network provides specific computational power indication information in the uplink grant to indicate the UE that the current computational power is sufficient. At this time, the terminal needs to compare the computational power provided in the uplink grant with the computational power needed by the logic channel, and in response to determining the former is larger than or equal to the latter, it means that the logic channel corresponding to the AI service or the ML service may be multiplexed into the uplink authorization signaling (grant).

As an example, the specific computational power indication information provided in the uplink authorization signaling (grant) may be N times of addition and multiplication.

As an example, the specific computational power indication information provided in the uplink authorization signaling (grant) may be memory consumption (the unit is bytes or bits, etc.).

The computational power needed by the logic channel may be estimated by the UE, and an estimation process is determined by a terminal algorithm itself.

The computational power resources needed by the logic channel are configured by the network.

As an example, the computational power information needed by the logic channel that can be configured in advance may be N times of addition and multiplication.

As an example, the computational power information needed by the logic channel that can be configured in advance may be memory consumption (the unit is bytes or bits, etc.).

A new logic channel multiplexing restriction added to the logic channel multiplexing corresponding to the AI service or the ML service may be an optional function or a mandatory function. An attribute of the mandatory function is a mandatory attribute. An attribute of the optional function is an optional attribute.

As an example, in case that the network is not configured with the function, it means that it is optional, and at this time, there is no additional restriction on the logic channel multiplexing corresponding to the AI service or the ML service.

An example provides a logic channel multiplexing method, including:

- in response to determining that transmitting a transmission belt corresponding to a new logic channel, the following conditions need to be met when selecting resources corresponding to uplink authorization signaling that meet the demand of the logic channel:
- whether a subcarrier interval index related to a to-be-transmitted logic channel is located in a list of subcarrier interval indexes allowed by the uplink authorization signaling is determined;
- in response to determining that the subcarrier interval index related to the logic channel is located in the list of the allowed subcarrier interval indexes, whether a maximum duration of a PUSCH scheduled by the uplink authorization signaling is larger than or equal to a duration of PUSCH transmission corresponding to the logic channel is determined;
- whether the uplink authorization signaling is a first type of uplink authorization signaling is determined;
- whether a service cell related to the uplink authorization signaling is uplink authorization signaling of the cell related to the logic channel is determined, for example, according to the cell information, whether packet data convergence protocol (PDCP) multiplexing configured by a data radio bearer (DRB) associated with the logic channel and the service cell associated with the uplink authorization signaling are located in the same MAC entity is determined; and
- whether computational power resources needed by the logic channel are less than or equal to the computational power resources provided by the uplink authorization signaling is determined.

In response to determining that results of the above determination are all yes, the above logic channel is multiplexed to the resources corresponding to the corresponding uplink authorization signaling.

As shown in FIG. 5, an example of the disclosure provides a logic channel multiplexing apparatus, performed by user equipment (UE), and including:

- a determining module 510, configured to determine a logic channel multiplexing operation based on a logic channel multiplexing restriction related to computational power.

In some examples, the determining module 510 may be a program module; and the program module can perform the logic channel multiplexing operation on the basis of the logic channel multiplexing restriction related to the computational power after being qualitative by a processor.

In some other examples, the determining module 510 may be a software and hardware combination module; the software and hardware module includes, but not limited to various programmable arrays; and the programmable arrays include, but not limited to a complex programmable array or a field programmable array.

In some further examples, the determining module 510 may include: a pure hardware module. The pure hardware module includes, but not limited to an application-specific integrated circuit.

In some examples, the apparatus further includes:

- a receiving module, configured to receive uplink authorization signaling, where the uplink authorization signaling is used to schedule resources for multiplexing of a logic channel.

In some examples, the receiving module may correspond to a network interface, or an antenna and the like.

In some examples, the uplink authorization signaling carries indication information of computational power resources.

In some examples, the indication information includes:

a flag bit, having one of the following values:

a first value, indicating having sufficient computational power resources;

or, a second value, indicating not having sufficient computational power resources.

In some examples, the indication information includes:

a computational power indication, used to indicate computational power resources of a network.

In some examples, the computational power resources are represented by at least one of the following computational power indications:

a computing quantity indication, used to indicate a computing quantity;

a computing bit length indication, used to indicate a computing bit length; or a memory consumption indication, used to indicate memory consumption during computing.

In some examples, the determining module 510 is configured to determine, in response to that the computational power resources corresponding to the uplink authorization signaling are larger than or equal to computational power resources needed by the logic channel, that a to-be-multiplexed logic channel is multiplexed to the resources corresponding to the uplink authorization signaling; or determine, in response to that the computational power resources corresponding to the uplink authorization signaling are less than the computational power resources needed by the logic channel, that the to-be-multiplexed logic channel is not multiplexed to the resources corresponding to the uplink authorization signaling.

In some examples, the computational power resources needed by the logic channel are determined by the UE, or configured by the network.

In some examples, the computational power resources needed by the logic channel are determined based on a communication protocol.

In some examples, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

Figure 6:
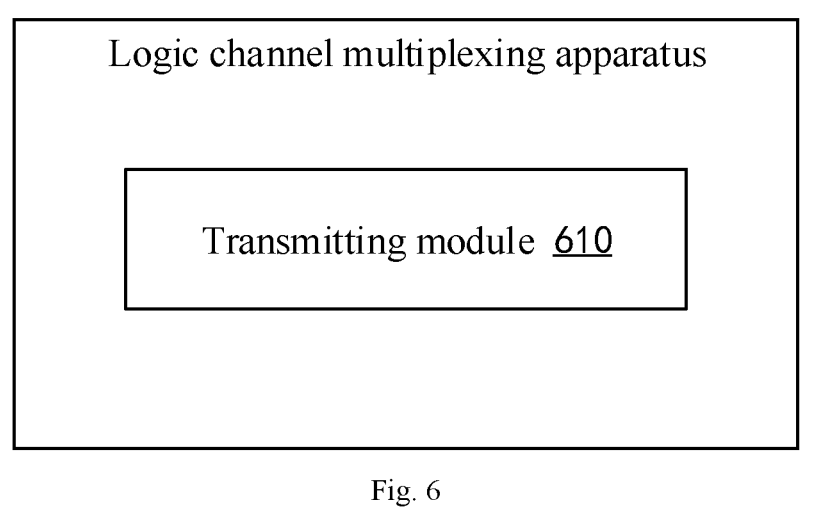

As shown in FIG. 6, an example of the disclosure provides a logic channel multiplexing apparatus, performed by a network side device, and including:

a transmitting module 610, configured to transmit uplink authorization signaling, where resources scheduled by the uplink authorization signaling are able to be used for logic channel multiplexing according to a logic channel multiplexing restriction related to computational power.

In some examples, the transmitting module 610 may be a program module; and the program module can issue the uplink authorization signaling after being qualitative by a processor.

In some other examples, the transmitting module 610 may be a software and hardware combination module; the software and hardware module includes, but not limited to various programmable arrays; and the programmable arrays include, but not limited to a complex programmable array or a field programmable array.

In some further examples, the transmitting module 610 may include: a pure hardware module. The pure hardware module includes, but not limited to an application-specific integrated circuit.

In some examples, the uplink authorization signaling provides indication information for indicating the computational power resources.

In some examples, the indication information includes:

a flag bit, having one of the following values:

a first value, indicating having sufficient computational power resources;

or, a second value, indicating not having sufficient computational power resources.

In some examples, the indication information includes:

a computational power indication, used to indicate the computational power resources.

In some examples, the computational power resources are represented by at least one of the following computational power indications:

a computing quantity indication, used to indicate a computing quantity;

a computing bit length indication, used to indicate a computing bit length; or a memory consumption indication, used to indicate memory consumption during computing.

In some examples, the transmitting module is further configured to:

transmit, configuration information of the logic channel to UE, where the configuration information is at least used to determine the computational power resources needed by the logic channel.

In some examples, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

An example of the disclosure provides a communication device, including a processor, a transceiver, a memory and an executable program stored on the memory and capable of being run by the processor, and the processor, when running the executable program, executes the logic channel multiplexing method provided by any aforementioned technical solution and performed by UE, or executes the logic channel multiplexing method provided by any aforementioned technical solution and performed by a base station.

The communication device may be the aforementioned base station or UE.

The processor may include storage media of various types. The storage media are non-transitory computer storage media, and can continue to memorize information stored after the communication device is powered down. Here, the communication device includes a base station or user equipment.

The processor may be connected with the memory via a bus and the like, and is configured to read executable programs stored on the memory, such as at least one of the methods shown in FIGS. 2 to 4.

An example of the disclosure provides a non-transitory computer-readable storage medium, storing an executable program; and the executable program can implement the method shown in any technical solution of the first aspect or the second aspect after being executed by a processor, such as at least one of the methods shown in FIGS. 2 to 4.

Figure 7:
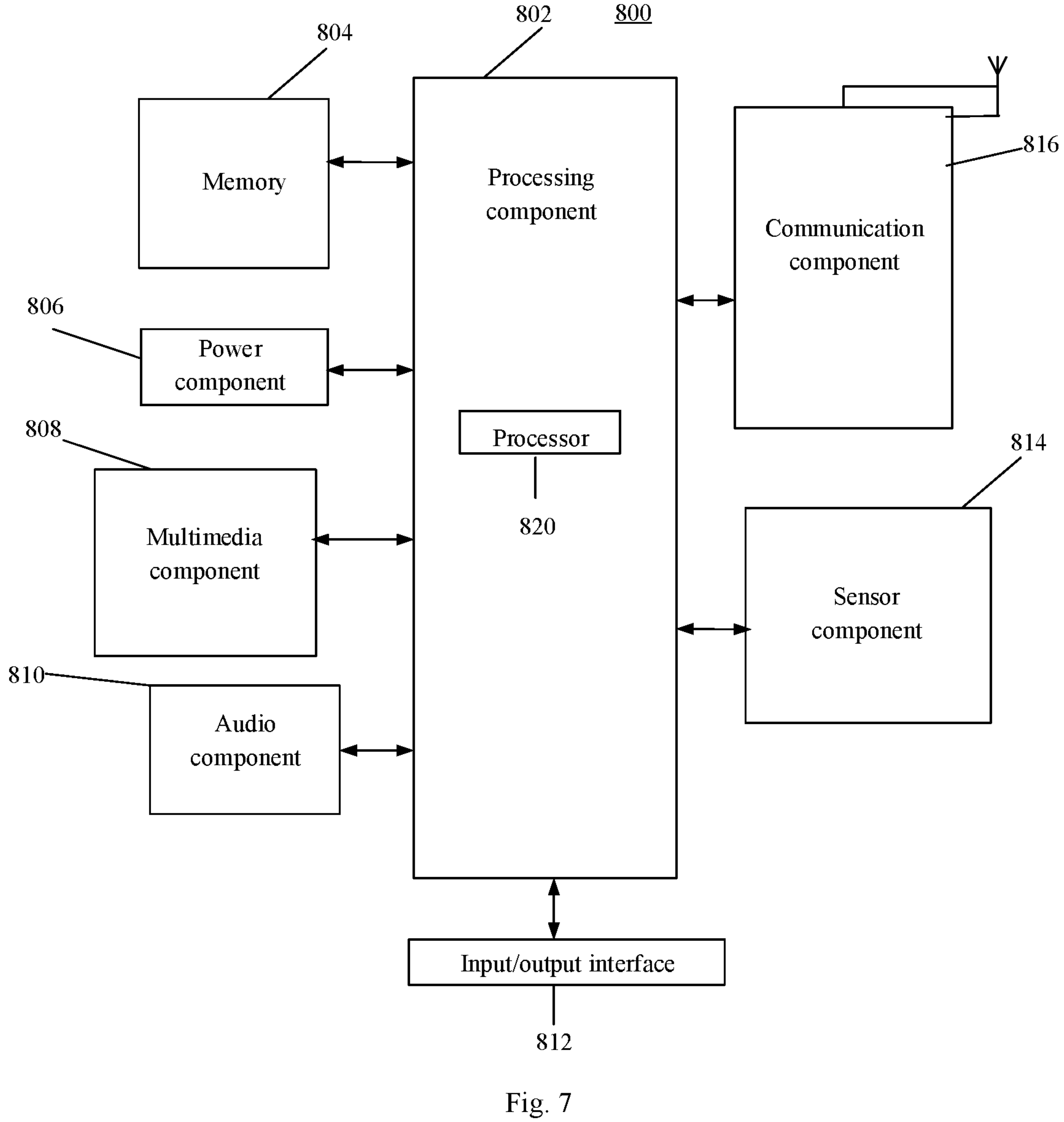
FIG. 7 is a schematic structural diagram of UE illustrated according to an example.

FIG. 7 is a block diagram of UE 800 illustrated according to an example. For instance, the UE 800 may be a mobile phone, a computer, a digital broadcasting user device, a messaging device, a game console, a tablet device, a medical device, a fitness device, a personal digital assistant, etc.

Referring to FIG. 7, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls an overall operation of the UE 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For instance, the processing component 802 may include a multimedia module to facilitate interaction between the multimedia component 808 and the processing component 802.

The memory 804 is configured to store various types of data to support operations at the UE 800. Instances of these data include instructions for any application or method operating on the UE 800, contact data, phonebook data, messages, pictures, videos, etc. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power component 806 provides power for various components of the UE 800. The power component 806 may include a power management system, one or more power sources and other components associated with generating, managing and distributing power for the UE 800.

The multimedia component 808 includes a screen providing an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor cannot only sense the boundary of the touch or sliding operation, but also detect the duration and pressure related to the touch or sliding operation. In some examples, the multimedia component 808 includes a front camera and/or a rear camera. When the UE 800 is in an operation mode, such as a shooting mode or a video mode, the front camera and/or the rear camera can receive external multimedia data. Each front camera and rear camera may be a fixed optical lens system or have a focal length and optical zoom capability.

The audio component 810 is configured to output and/or input audio signals. For instance, the audio component 810 includes a microphone (MIC) configured to receive an external audio signal when the UE 800 is in the operation mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module which may be a keyboard, a click wheel, a button, etc. These buttons may include, but not limited to: a home button, volume buttons, a start button and a lock button.

The sensor component 814 includes one or more sensors for providing state evaluation of various aspects of the UE 800. For instance, the sensor component 814 can detect an on/off state of the equipment 800 and the relative positioning of the components, for example, the component is a display and a keypad of the UE 800. The sensor component 814 can also detect the change of the position of the UE 800 or one component of the UE 800, the presence or absence of contact between a user and the UE 800, the azimuth or acceleration/deceleration of the UE 800, and temperature change of the UE 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the UE 800 and other devices. The UE 800 may access a wireless network based on a communication standard, such as WiFi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For instance, the NFC module may be implemented based on a radio frequency identification (RFID) technology, an infrared data association (IrDA) technology, an ultra wideband (UWB) technology, a Bluetooth (BT) technology and other technologies.

In an example, the UE 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the above method.

In an example, a non-transitory computer-readable storage medium including instructions is further provided, such as the memory 804 including instructions capable of being executed by the processor 820 of the UE 800 to complete the above method. For instance, the non-transitory computer-readable storage medium may be an ROM, a random access memory (RAM), a CD-ROM, a magnetic tape, a floppy disk, an optical data storage device, etc.

Figure 8:
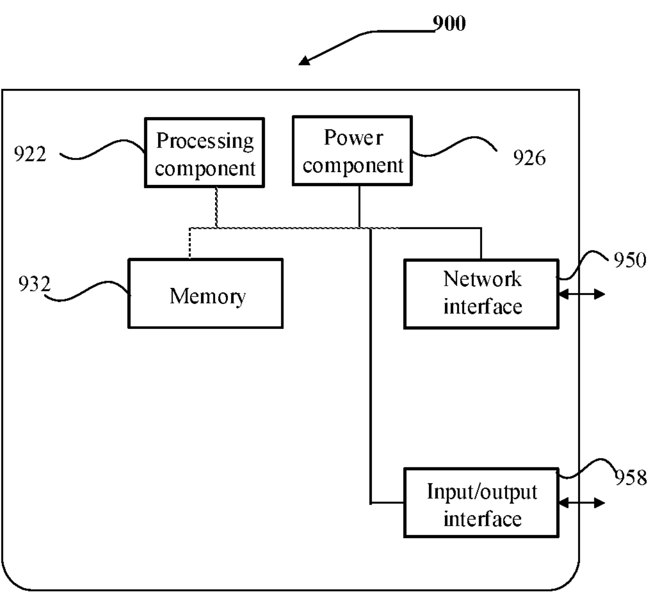
FIG. 8 is a schematic structural diagram of a base station illustrated according to an example.

As shown in FIG. 8, an example of the disclosure provides a structure of a base station. For instance, the base station 900 may be provided as a network-side device. Referring to FIG. 8, the base station 900 includes a processing component 922, which further includes one or more processors, and a memory resource represented by a memory 932, which is configured to store instructions, such as applications, executable by the processing component 922. The applications stored in the memory 932 may include one or more modules each corresponding to a set of instructions. In addition, the processing component 922 is configured to execute instructions to execute any of the methods performed by the base station, such as the methods shown in FIGS. 2-3.

The base station 900 may further include the power component 926 configured to execute power management of the base station 900, a wired or wireless network interface 950 configured to connect the base station 900 to the network, and an input/output (I/O) interface 958. The base station 900 may operate an operating system stored in the memory 932, such as Windows Server™, Mac OS X™, Unix™, Linux™, FreeBSD™ and the like.

Other examples of the disclosure will be apparent to those skilled in the art from consideration of the specification and practice of the disclosure here. The disclosure is intended to cover any variations, uses, or adaptations of the disclosure following the general principles of the disclosure and including such departures from the disclosure as come within known or customary practice in the art. It is intended that the specification and examples are considered as examples merely, with a true scope and spirit of the disclosure being indicated by the following claims.

It will be appreciated that the disclosure is not limited to the exact construction that has been described above and illustrated in the accompanying drawings, and that various modifications and changes may be made without departing from its scope. It is intended that the scope of the disclosure merely is limited by the appended claims.

Examples of the disclosure provide a logic channel multiplexing method and apparatus, a communication device, and a storage medium.

A first aspect of an example of the disclosure provides a logic channel multiplexing method, performed by user equipment (UE), and including:

determining a logic channel multiplexing operation based on a logic channel multiplexing restriction related to computational power.

Optionally, the method further including:

receiving uplink authorization signaling, wherein the uplink authorization signaling is used to schedule resources for multiplexing of a logic channel.

Optionally, the uplink authorization signaling carries indication information of computational power resources.

Optionally, the indication information includes:

a flag bit, having one of the following values:

a first value, indicating having sufficient computational power resources;

or, a second value, indicating not having sufficient computational power resources.

Optionally, the indication information includes:

a computational power indication, used to indicate computational power resources of a network.

Optionally, the computational power indication comprises at least one of the following:

a computing quantity indication, used to indicate a computing quantity;

a computing bit length indication, used to indicate a computing bit length; or a memory consumption indication, used to indicate memory consumption during computing.

Optionally, determining the logic channel multiplexing operation based on the logic channel multiplexing restriction related to the computational power, includes:

determining, in response to that the computational power resources corresponding to the uplink authorization signaling are larger than or equal to computational power resources needed by the logic channel, that a to-be-multiplexed logic channel is multiplexed to the resources corresponding to the uplink authorization signaling; or determining, in response to that the computational power resources corresponding to the uplink authorization signaling are less than or equal to the computational power resources needed by the logic channel, that the to-be-multiplexed logic channel is not multiplexed to the resources corresponding to the uplink authorization signaling.

Optionally, the computational power resources needed by the logic channel are determined by the UE, or configured by the network, or determined based on a communication protocol.

Optionally, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

A second aspect of an example of the disclosure provides a logic channel multiplexing method, performed by a network side device, and including:

transmitting uplink authorization signaling, where resources scheduled by the uplink authorization signaling are able to be used for logic channel multiplexing according to a logic channel multiplexing restriction related to computational power.

Optionally, the indication information that indicates computational power resources is provided in the uplink authorization signaling.

Optionally, the indication information includes:

a flag bit, having one of the following values:

a first value, indicating having sufficient computational power resources;

or, a second value, indicating not having sufficient computational power resources.

Optionally the indication information includes:

a computational power indication, used to indicate computational power resources of a network.

Optionally, the computational power indication includes at least one of the following:

a computing quantity indication, used to indicate a computing quantity;

a computing bit length indication, used to indicate a computing bit length; or a memory consumption indication, used to indicate memory consumption during computing.

Optionally, the method further including:

transmitting configuration information of a logic channel to UE, wherein the configuration information is at least used to determine the computational power resources needed by the logic channel.

Optionally, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

A third aspect of an example of the disclosure provides a logic channel multiplexing apparatus, performed by user equipment (UE), and including:

a determining module, configured to determine a logic channel multiplexing operation based on a logic channel multiplexing restriction related to computational power.

Optionally, the apparatus further including:

a receiving module, configured to receive uplink authorization signaling, wherein the uplink authorization signaling is used to schedule resources for multiplexing of a logic channel.

Optionally, the uplink authorization signaling carries indication information of computational power resources.

Optionally, the indication information includes:

a flag bit, having one of the following values:

a first value, indicating having sufficient computational power resources;

or, a second value, indicating not having sufficient computational power resources.

Optionally, the indication information includes:

a computational power indication, used to indicate computational power resources of a network.

Optionally, the computational power resources are represented by at least one of the following computational power indications:

a computing quantity indication, used to indicate a computing quantity;

a computing bit length indication, used to indicate a computing bit length; or a memory consumption indication, used to indicate memory consumption during computing.

Optionally, the determining module is configured to:

determine, in response to that the computational power resources corresponding to the uplink authorization signaling are larger than or equal to computational power resources needed by the logic channel, that a to-be-multiplexed logic channel is multiplexed to the resources corresponding to the uplink authorization signaling; or determine, in response to that the computational power resources corresponding to the uplink authorization signaling are less than the computational power resources needed by the logic channel, that the to-be-multiplexed logic channel is not multiplexed to the resources corresponding to the uplink authorization signaling.

Optionally, the computational power resources needed by the logic channel are determined by the UE, or configured by the network.

Optionally, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

A fourth aspect of an example of the disclosure provides a logic channel multiplexing apparatus, performed by a network side device, and including:

a transmitting module, configured to transmit uplink authorization signaling, where resources scheduled by the uplink authorization signaling are able to be used for logic channel multiplexing according to a logic channel multiplexing restriction related to computational power.

Optionally, the indication information that indicates computational power resources is provided in the uplink authorization signaling.

Optionally, the indication information includes:

a flag bit, having one of the following values:

a first value, indicating having sufficient computational power resources;

or, a second value, indicating not having sufficient computational power resources.

Optionally, the indication information includes:

a computational power indication, used to indicate the computational power resources.

Optionally, the computational power resources are represented by at least one of following computational power indications:

a computing quantity indication, used to indicate a computing quantity;

a computing bit length indication, used to indicate a computing bit length; or a memory consumption indication, used to indicate memory consumption during computing.

Optionally, the transmitting module is further configured to:

transmit configuration information of the logic channel to UE, wherein the configuration information is at least used to determine the computational power resources needed by the logic channel.

Optionally, the logic channel multiplexing restriction related to the computational power is one of the following:

a mandatory attribute, indicating that consideration of the logic channel multiplexing restriction related to the computational power is requisite when determining the logic channel multiplexing operation;

or, an optional attribute, indicating that the consideration of the logic channel multiplexing restriction related to the computational power is not requisite when determining the logic channel multiplexing operation.

A fifth aspect of an example of the disclosure provides a communication device, including a processor, a transceiver, a memory and an executable program stored on the memory and capable of being run by the processor, and the processor, when running the executable program, executes the method shown in any technical solution of the first aspect or the second aspect.

A sixth aspect of an example of the disclosure provides a computer storage medium, storing an executable program; and the executable program can implement the method shown in any technical solution of the first aspect or the second aspect after being executed by a processor.

According to the technical solutions provided by the examples of the disclosure, in case that the logic channel multiplexing restriction related to the computational power is considered during the logic channel multiplexing, after the logic channel multiplexing, there will be no phenomenon of uplink transmission failure, high retransmission rate of uplink transmission or poor service quality of services caused by a situation that a network side cannot provide the computational power resources needed by a logic channel, thus improving the service quality of uplink services.

The invention claimed is:

1. A logic channel multiplexing method, performed by a user equipment (UE), and comprising:

determining a logic channel multiplexing operation based on a logic channel multiplexing restriction related to computational power;

wherein determining the logic channel multiplexing operation based on the logic channel multiplexing restriction related to the computational power comprises:

determining, in response to that computational power resources corresponding to uplink authorization signaling received from a network-side device are less than or equal to computational power resources needed by a logic channel, that a to-be-multiplexed logic channel is not multiplexed to resources corresponding to the uplink authorization signaling, wherein the computational power resources at least comprise computing resources and storage resources.

2. The logic channel multiplexing method according to claim 1, further comprising:

receiving the uplink authorization signaling, wherein the uplink authorization signaling is used to schedule resources for multiplexing of the logic channel.

3. The logic channel multiplexing method according to claim 2, wherein the uplink authorization signaling carries indication information of the computational power resources.

4. The logic channel multiplexing method according to claim 3, wherein the indication information comprises:

a flag bit, having one of the following values:

a first value, indicating having sufficient computational power resources;

or a second value, indicating not having the sufficient computational power resources.

5. The logic channel multiplexing method according to claim 3, wherein the indication information comprises:

a computational power indication, used to indicate computational power resources of a network.

6. The logic channel multiplexing method according to claim 5, wherein the computational power indication comprises at least one of the following:

a computing quantity indication, used to indicate a computing quantity;

a computing bit length indication, used to indicate a computing bit length; or a memory consumption indication, used to indicate memory consumption during computing.

7. The logic channel multiplexing method according to claim 1, wherein determining the logic channel multiplexing operation based on the logic channel multiplexing restriction related to the computational power, further comprises:

determining, in response to that the computational power resources corresponding to the uplink authorization signaling are larger than the computational power resources needed by the logic channel, that the to-be-multiplexed logic channel is multiplexed to the resources corresponding to the uplink authorization signaling.

8. The logic channel multiplexing method according to claim 7, wherein the computational power resources needed by the logic channel are:

determined by the UE, configured by a network, or determined based on a communication protocol.

9. The logic channel multiplexing method according to claim 1, wherein the logic channel multiplexing restriction related to the computational power comprises one of the following:

a mandatory attribute, indicating that consideration of the logic channel multiplexing restriction related to the computational power is requisite in a case where the logic channel multiplexing operation is determined; or an optional attribute, indicating that the consideration of the logic channel multiplexing restriction related to the computational power is not requisite in a case where the logic channel multiplexing operation is determined.

10. A logic channel multiplexing method, performed by a network-side device, and comprising:

transmitting uplink authorization signaling, wherein resources scheduled by the uplink authorization signaling are able to be used for logic channel multiplexing according to a logic channel multiplexing restriction related to computational power, wherein the uplink authorization signaling is configured to enable a user equipment (UE) to determine that a to-be-multiplexed logic channel is not multiplexed to resources corresponding to the uplink authorization signaling in a case where computational power resources corresponding to the uplink authorization signaling are less than or equal to computational power resources needed by a logic channel, and the computational power resources at least comprise computing resources and storage resources.

11. The logic channel multiplexing method according to claim 10, wherein indication information that indicates the computational power resources is provided in the uplink authorization signaling.

12. The logic channel multiplexing method according to claim 11, wherein the indication information comprises:

a flag bit, having one of the following values:

a first value, indicating having sufficient computational power resources;

or a second value, indicating not having the sufficient computational power resources.

13. The logic channel multiplexing method according to claim 12, wherein the indication information comprises:

a computational power indication, used to indicate computational power resources of a network.

14. The logic channel multiplexing method according to claim 13, wherein the computational power indication comprises at least one of the following:

a computing quantity indication, used to indicate a computing quantity;

a computing bit length indication, used to indicate a computing bit length; or a memory consumption indication, used to indicate memory consumption during computing.

15. The logic channel multiplexing method according to claim 10, further comprising:

transmitting configuration information of the logic channel to the UE, wherein the configuration information is at least used to determine the computational power resources needed by the logic channel.

16. The logic channel multiplexing method according to claim 10, wherein the logic channel multiplexing restriction related to the computational power comprises one of the following:

a mandatory attribute, indicating that consideration of the logic channel multiplexing restriction related to the computational power is requisite in a case where a logic channel multiplexing operation is determined; or an optional attribute, indicating that the consideration of the logic channel multiplexing restriction related to the computational power is not requisite in a case where a logic channel multiplexing operation is determined.

17. A communication device, comprising a processor, a transceiver, a memory and an executable program stored on the memory and capable of being run by the processor, wherein the processor, when running the executable program, executes the logic channel multiplexing method provided by claim 10.

18. A non-transitory computer-readable storage medium, storing an executable program, wherein the executable program can implement the logic channel multiplexing method provided by claim 1 after being executed by a processor.

19. A communication device comprising a processor, a transceiver, a memory and an executable program stored on the memory and capable of being run by the processor, wherein the processor, when running the executable program, executes:

determining a logic channel multiplexing operation based on a logic channel multiplexing restriction related to computational power;

wherein the processor, when running the executable program, further executes:

determining, in response to that computational power resources corresponding to uplink authorization signaling received from a network-side device are less than or equal to computational power resources needed by a logic channel, that a to-be-multiplexed logic channel is not multiplexed to resources corresponding to the uplink authorization signaling, wherein the computational power resources at least comprise computing resources and storage resources.

20. A non-transitory computer-readable storage medium storing an executable program, wherein the executable program can implement the logic channel multiplexing method provided by claim 10 after being executed by a processor.

* * * * *